C. ALGER.
Breech-Loading Ordnance.

No. { 2,972. } { 33,976. }

Patented Dec 24, 1861.

Witnesses

Inventor

UNITED STATES PATENT OFFICE.

CHARLES ALGER, OF HUDSON, NEW YORK.

IMPROVEMENT IN BREECH-LOADING ORDNANCE.

Specification forming part of Letters Patent No. 33,976, dated December 24, 1861.

*To all whom it may concern:*

Be it known that I, CHARLES ALGER, of Hudson, in the county of Columbia and State of New York, have invented a new and useful Improvement in Breech-Loading Ordnance and Fire-Arms; and I do hereby declare that the following is a full, clear, and exact description of the same, reference being had to the accompanying drawings, forming part of this specification, in which—

Figure 1:
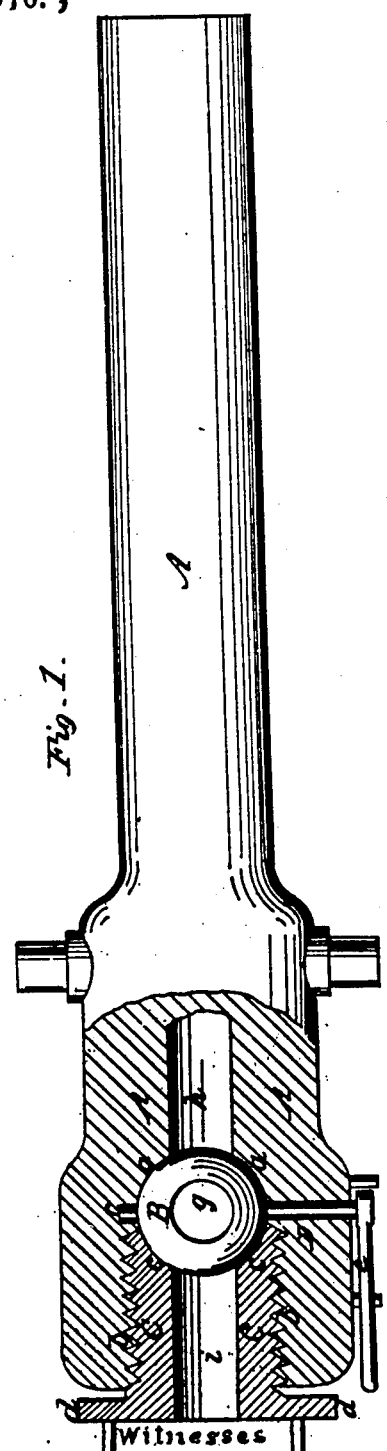
Figure 2:
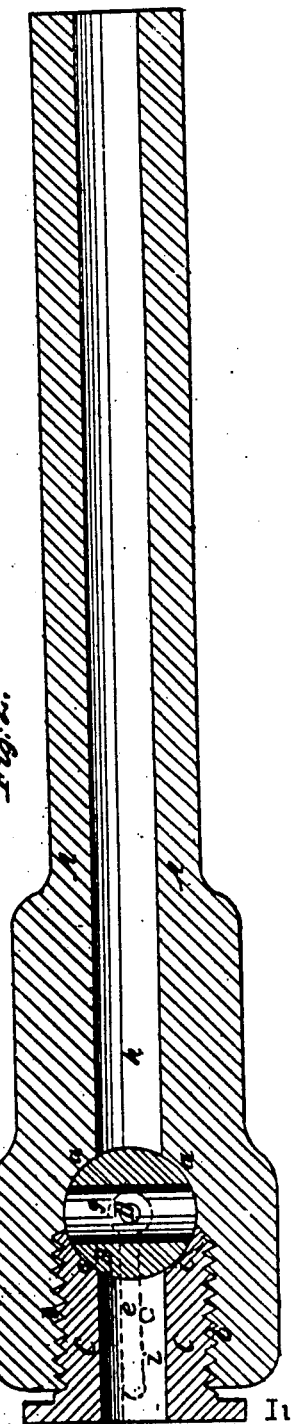

Figure 1 is a top view of a cannon constructed according to my invention, showing the breech in section; and Fig. 2, a central longitudinal vertical section of the same.

Similar letters of reference indicate corresponding parts in both figures.

This invention consists in a breech composed of a spherical piece of metal inserted into a hemispherical seat provided in the gun in rear of its bore, and confined therein by means of a hollow screw, which is screwed into the rear of the gun behind it, said screw having its front end countersunk to fit and form the rear seat for the said spherical piece, and the said spherical piece having an opening centrally through it of sufficient size, and the internal caliber of the hollow screw being sufficient to permit the projectile and the cartridge to be inserted through them into the chamber of the gun, and the said spherical piece being furnished with suitable means of turning it to bring its opening transverse to the bore, and thereby make it close the rear of the gun, and to bring it opposite the bore for loading at the breech.

To enable others skilled in the art to make and use my invention, I will proceed to describe its construction and operation.

A is the barrel or body of the gun, bored throughout of the requisite caliber, and then counterbored from the rear of a much larger caliber, and having its counterbore finished in front of hemispherical form, as shown at $a$ $a$, to receive and form a seat for the spherical breech-piece B, which should be of steel or other hard metal, and which is inserted from the rear. In rear of the seat $a$ $a$ a female screw-thread, $b$ $b$, is cut in the counterbore for the reception of the hollow screw C, in the front end of which is countersunk a seat, $c$ $c$, fitting the spherical breech-piece. The hollow screw is furnished at its rear end with a flange, $d$, for the attachment of handles $f$ $f$, levers, or other means of turning the said screw in the female screw-thread $b$ $b$. The seat $c$ $c$ may be faced with other metal than that of which the hollow screw is formed—for instance, of steel, the hollow screw being made of wrought-iron; or the entire hollow screw may be made of steel. When the screw is screwed close up to the breech-piece, the seats $c$ $c$ and $a$ $a$ combine to form a spherical cavity, in which the breech-piece is confined.

D is a spindle inserted through a bearing bored transversely through one side of the body or barrel A, and entering the breech-piece radially to its center; and $r$ is a journal provided at the opposite side of the breech-piece to enter a bearing provided on the opposite side of the gun, said spindle and journal having their axes in line with each other, and their bearings being in line with each other and opposite the center of the spherical cavity before mentioned. The inner end of the spindle is made with a square to fit a square hole cut in the spherical breech-piece, to enable the said spindle, by the application of a lever, $e$, or wheel to its outer end, to turn the breech-piece to bring its central opening, $g$, in line with the bore $h$ of the gun for loading at the breech, and to bring the said opening to the transverse position shown in Figs. 1 and 2, to close the chamber or rear of the bore $h$ after the insertion of the projectile and cartridge therein. The bearings for the spindle D should be slightly widened in the direction of the length of the gun, to enable the breech-piece to be set up tight against the seat $a$ $a$ of the hollow screw. The opening $g$ through the breech-piece B and the bore $i$ of the hollow screw should be somewhat larger than the bore $h$, in order to enable the projectile and cartridge to pass easily through them. The hollow screw C, when once adjusted to the breech-piece, needs never to be disturbed, except to be screwed up to compensate for wear of the breech-piece or seats, or to be taken out to permit the removal of the breech-piece for any purpose. The vent of the gun may pass through the spherical breech-piece or through the portion of the gun in front of it.

In order to prevent any escape of gas between the seat $a$ $a$ and the breech-piece, and the consequent corrosion of their surfaces, I intend to insert in the bore $h$, after the cartridge, a ring or disk of sole-leather of a circumference fully as large or slightly larger than the rear portion of the said bore, previously soaking the said ring or disk in grease or water. When the explosion of the charge takes place, this ring or disk is driven back against the breech-piece and slightly expanded in a radial or circumferential direction, so as to cover the joint between the bore $h$ and the breech-piece, and to have expressed from it some of the grease or water, which, if the joint is not perfectly close, enters and seals it. This ring or disk remains in the gun after the firing and after the opening of the breech, and is pushed forward by the next projectile and driven out through the muzzle by the next discharge, and so made to swab the gun.

What I claim as my invention, and desire to secure by Letters Patent, is—

The spherical breech-piece B, having a central opening, $g$, and the hollow screw C, applied in combination with each other and with the barrel or body A of the gun, substantially as herein described.

CHAS. ALGER.

Witnesses:
ABRAHAM S. PEET,
S. SEYMOUR.